(No Model.) 2 Sheets—Sheet 2.
J. F. STEWARD.
PLATFORM ADJUSTMENT FOR HARVESTERS.
No. 341,358. Patented May 4, 1886.
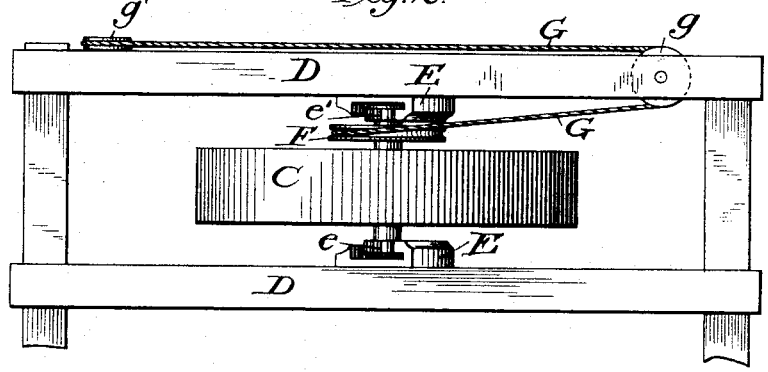
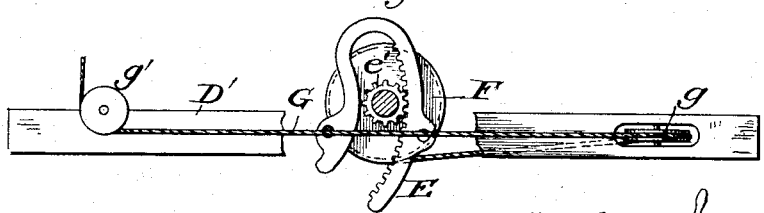
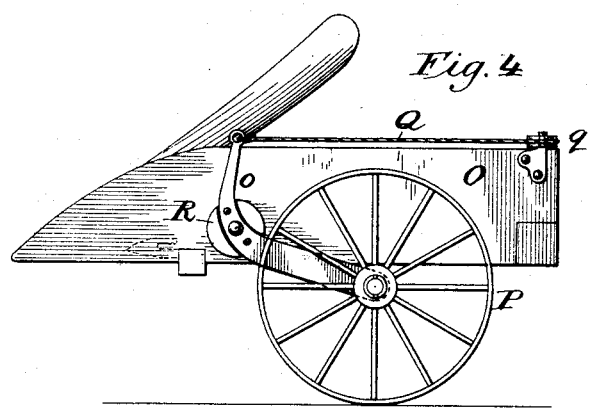
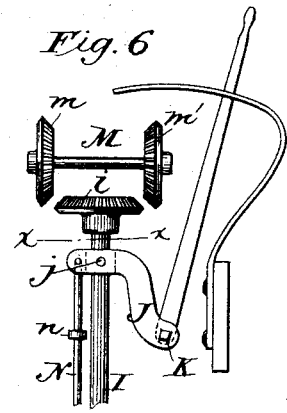
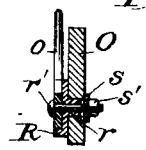
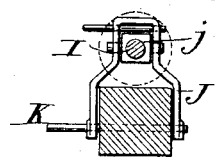
Attest.
Sidney P. Hollingsworth.
Dan'l Kelly.
Inventor.
John F. Steward
by Parkinson & Parkinson
Attys.

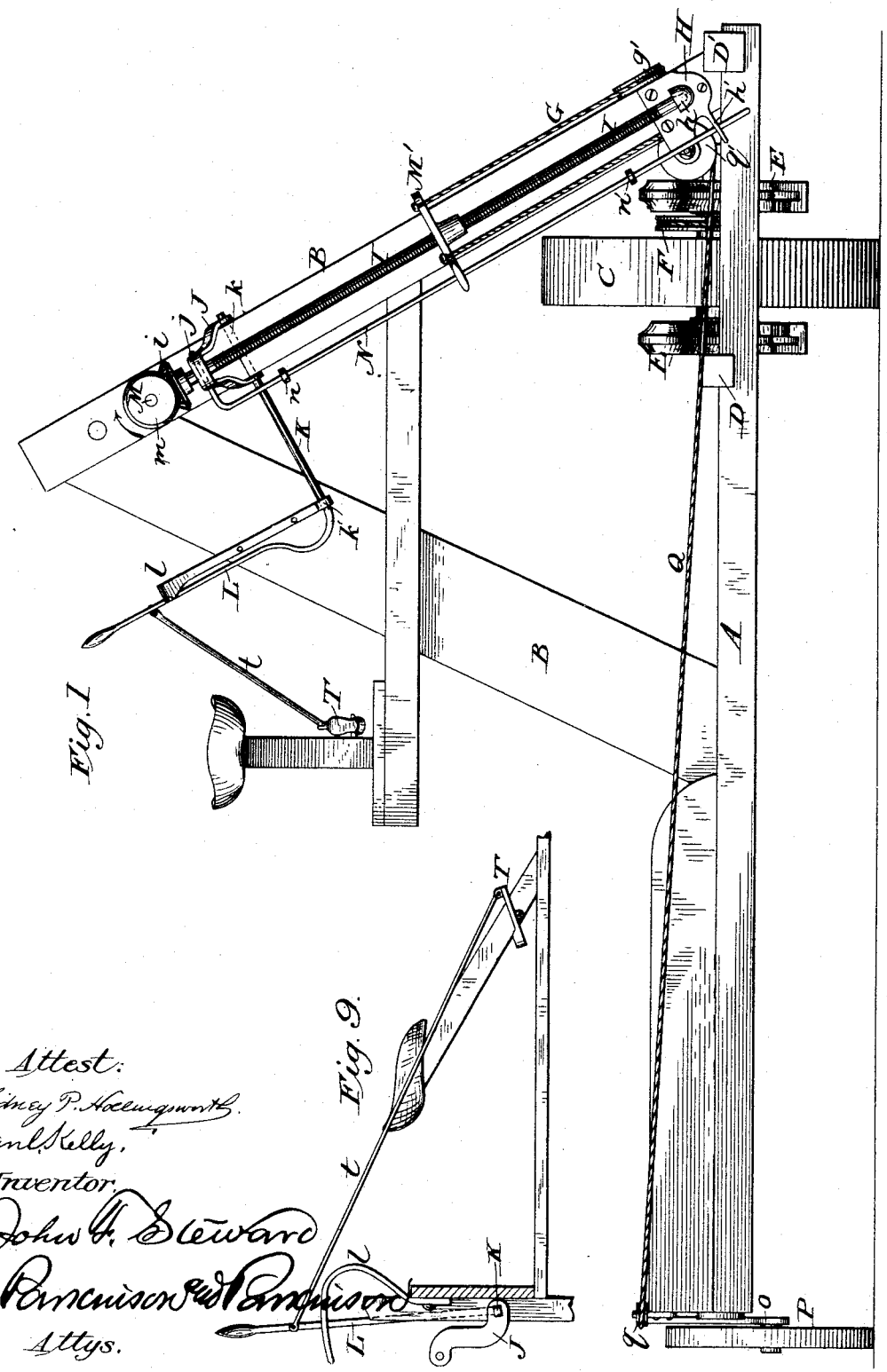

UNITED STATES PATENT OFFICE.

JOHN F. STEWARD, OF CHICAGO, ILLINOIS.

PLATFORM ADJUSTMENT FOR HARVESTERS.

SPECIFICATION forming part of Letters Patent No. 341,353, dated May 4, 1886.

Application filed August 20, 1881. Serial No. 40,326. (No model.)

*To all whom it may concern:*

Be it known that I, JOHN F. STEWARD, of Chicago, in the county of Cook and State of Illinois, have invented certain new and useful Improvements in Platform Adjustments for Harvesters, of which the following is a specification.

My invention relates to means whereby the frame of the harvester is raised and lowered on its carrying or supporting wheel or wheels; and it consists in adjusting mechanism operated by power derived from the draft of the team, and means controllable at will, whereby, without stopping the machine, it may be thrown into action to raise the main frame bodily upon its supporting wheel or wheels or out of action to hold it in position or reversed to lower it; in the combination, with power-operated adjusting mechanism for raising or lowering the harvester-frame upon its supporting wheel or wheels and means controllable at will to throw it in or out of action, of a safety-trip operating to automatically disconnect it from its driver whenever the extreme limit of adjustment in either direction is reached; in adjusting mechanism acting to change the position of the wheel relatively to the main frame in which it is supported and driven by the harvester-gearing, and means, controllable at will, whereby it may be thrown into or out of engagement with said gearing without stopping the machine; in adjusting mechanism driven by reverse-gears on the harvester, and means, controllable by the attendant, whereby it may be thrown into engagement with one or the other of said gears to raise or lower the harvester-frame, or out of engagement altogether to hold it in its adjusted position; in combining with the axle supported by fast pinions at its ends which take into rack-standards on the frame, a pulley or chain wheel keyed thereto, a rope, band, or chain taking over said pulley or wheel, and mechanism operated by power derived from the draft of the machine and thrown in or out of action at will, whereby said rope, band, or chain may be taken up or let out to raise or lower the frame; in combining with the axle supported by fast pinions at its ends which take into rack-standards on the frame, a pulley or chain wheel keyed thereto, a rope, band, or chain taking over said pulley, a screw-rod upon the harvester-frame, a traveler upon said screw-rod to which the rope, band, or chain is led over suitable guide-pulleys, and whereby its end is held, and reverse-gears upon a driven shaft of the harvester with one or the other of which a pinion upon the end of the screw-rod may at will be caused to engage to move the traveler in one direction or the other; in combining with the reverse-gears, screw-rod, and traveler, by which the rope, band, or chain of the adjusting mechanism is taken up or let out, a trip arranged to be operated by the traveler or other suitable moving part as one extreme or the other of feasible adjustment is reached to automatically throw the screw-rod out of engagement with the harvester gearing, and in the various other features, combinations, and details of construction hereinafter described and claimed.

In the drawings, Figure 1 is a rear elevation of a harvester embodying my invention. Fig. 2 is a bottom plan view of the main wheel-frame, showing the wheel supported therein; Fig. 3, a side elevation of the main wheel-frame with the outer sill partly broken away to exhibit certain parts of the adjusting mechanism; Fig. 4, an elevation from the grain side of the divider-board and grain-wheel; Fig. 5, a detail of the grain-wheel pivot; Fig. 6, a detached view of the mechanism for driving the screw-rod and for throwing it into or out of engagement; Fig. 7, a section on the line $x\,x$ of Fig. 6; Fig. 8, a plan of the traveler-block, and Fig. 9 an elevation of the lever and pedal whereby the adjusting mechanism may be thrown into action.

A is the main frame of the harvester, and B the elevator-frame. Beneath the elevator-frame is the main or drive wheel C, running loose upon its axle.

Upon the side sills, D D', of the wheel-frame are mounted the segmental rack-standards E, into the racks of which pinions $e\,e'$, fast to the respective ends of the axle, are caused to take, so that by the rotation of the axle in one direction or the other the pinions may be made to travel up or down along the racks, and thus lower or raise the frame.

The parts as thus far described are, for the purpose of illustration, substantially the same as corresponding parts shown and described in Letters Patent No. 179,140, granted to John F. Steward and Frank J. Coddington on the 27th day of June, 1876, to which reference may be made for a more minute and detailed explanation of their construction, purpose, and operation.

Keyed fast to the axle between the main wheel and the outside standard, E', is a pulley, F, to which is attached one end of a wire rope, G, in such manner that it may wind upon its periphery. From this pulley the rope is carried over suitable guide-sheaves, $g$ $g'$, which I prefer to arrange as shown—one at the front and the other at the rear end of the outside sill, D'—but which may afford a more direct communication to apparatus at the rear of the harvester or elevator frame, by which it can be taken in to unwind it from the pulley or let out to permit it to wind thereupon. Whenever it is unwound from the pulley, the latter is rotated in a sense opposed to the constant stress of the heavy harvester-frame upon the axle-pinions geared with the rack-standards, and these pinions of necessity, rotating with the pulleys, to which they are fast by the intermediate axle-connection, force up the standards and with them the frame. When the rope is let out, the weight of the frame forces the racks down upon the pinions, causing them to turn and permit its descent, and the pulley or drum turning with them winds the rope upon its periphery and keeps it taut. The frame having been adjusted to any desired point will be held in position by stopping the apparatus, by which the taking up and letting out of the rope is accomplished, and practically locking it against movement. The stress of the rope will then be opposed to the stress of the frame, the pinions will be unable to turn in their racks, and the frame cannot descend.

It is desirable in machines of this class that adjustments of whatever nature, whether contingent upon changes in the character of the crop in a single field or changes in the species of crops to be harvested, shall be capable of being made without stopping the team, and that the driver or attendant shall be relieved as far as possible of the actual labor of making them. This is especially true of the adjustment in height of the harvester-frame, which is quite frequently required and which, owing to the great weight of the frame with its attachments, is no easy task. I therefore deem it preferable to so construct the apparatus for taking up and letting out the rope or holding it fixed against the downward tendency of the frame that it may be operated by power derived from the draft of the machine to change the adjustment and provide means controllable by the attendant, by which it may at will be brought into or out of the action of said power.

The best form of such apparatus now known to me is as follows: At the rear of the elevator near the junction of the outside sill, D', and the outer strut of the elevator-frame, I attach a casting, H, having a step or socket, $h$, which receives the foot of a screw-rod, I, running up along the face of the strut until it terminates near the head of the elevator in a bevel-pinion, $i$. For a short distance below the pinion the rod is turned or left smooth, and this smooth part is received in a box, $j$, swiveled in a yoke-piece, J, from a rock-shaft, K, which has one bearing, $k$, in or upon the outside strut and another, $k'$, upon the inside strut. For strength and convenience the yoke-piece may be made to embrace the outside strut, as shown. To the inner end of the rock-shaft is secured a lever, L, which passes up to within reach of the driver's seat and engages with a rack, $l$, by which it is held in position. When this lever is moved, the yoke-piece will be rocked and the head of the screw-rod swung or vibrated in or out.

Upon a driven shaft, M, projecting from the elevator just above the head of the screw-rod, and which may or may not be the drum-shaft of one of the elevator-rolls, are keyed two reversed bevel-gears, $m$ $m'$, and so arranged that the pinion $i$ on the screw-rod may be thrown into engagement with either of them by vibrating the rod, or left between them out of the range of their action altogether, for which purpose the rack $l$, into which the lever takes, will be provided with three notches corresponding with these respective positions. The rear end of the wire rope, after passing over the sheave $g'$, is attached to a nut or traveler-block, M', threaded upon the screw-rod, but prevented from turning therewith by a guide rail or rod, N, or equivalent means, so that the rotation of the screw-rod will cause it to travel up or down and take in or let out the rope. When, therefore, the pinion on the screw-rod is thrown into mesh with the gear $m$ on shaft M, the traveler will move up, drawing the rope from the axle-pulley and raising the harvester-frame; but if the pinion is thrown into mesh with the pulley $m'$, the traveler will move down, allowing the frame to sink. When it is out of mesh altogether, the traveler will be stationary on the screw-rod and the frame will be held in its adjusted position. Ordinarily the driver may be relied upon to exercise sufficient care to throw the pinion out of mesh when the proper adjustment is reached and before the extreme possible limit of adjustment; but this is not invariably the case, therefore I provide a trip which will automatically throw the pinion out whenever from any reason the extreme limit is reached, and before any danger of breakage is incurred.

For economy of parts and greater simplicity of construction, the guide-rod N is employed as a part of the tripping mechanism. To this end it is pivoted at its upper end to the yoke-piece J, and at the lower end passes through a guide-finger, $h'$, projecting from the casting H, and is free to slide therein. Toward the upper end of the rod, at such a point that it will be struck by the traveler in its upward movement just before the proper extreme of adjustment due to said movement is reached, is affixed a collar or lug, n, and toward the lower end, in the same relation to the downward movement and consequent extreme of adjustment, is a similar collar or lug, n', also fast to the guide-rod. Supposing, now, the pinion i to be thrown into mesh with gear m by a downward rocking of the yoke-piece and left unattended, the traveler will ascend until it strikes the lug n, which will be pushed before it until the consequent upward motion of the guide-rod has overcome the engagement of the lever L with the rack l, which will be but just sufficient to hold it normally steady, and by raising the yoke-piece has thrown the pinion out of mesh. The traveler will then stop. The action when the pinion is in mesh with gear m' is the same, except that the traveler then descending strikes the lug n' and the motion of the rod is reversed. Whenever the main wheel is adjusted to any considerable extent, it is necessary to adjust also the grain-wheel. It is more advantageous still to have every adjustment of the main-wheel, however slight, accompanied by a corresponding adjustment of the grain-wheel. That this may be done without loss of time and with perfect accuracy in the co-ordinate adjustment, I propose to so mount and connect the grain-wheel that its rise and fall shall be induced and controlled by the same actuating mechanism that induces and controls the rise and fall of the main wheel, such mechanism being in this instance the screw-rod and connections and the traveler.

To the divider-board O is pivoted a cranked lever-arm, o, bearing at its rear or lower end the grain-wheel P, and at the other or upper having secured to it the wire rope Q, which is thence led over guide-sheaves q and q', suitably arranged to a point beneath the traveler, and then carried up and attached thereto. When, therefore, the traveler-block rises to carry down the main wheel and lift the harvester-frame, it also, through the rope Q and cranked lever, forces down the grain-wheel, thereby simultaneously lifting the frame at each end, and when it descends the frame is likewise permitted to sink at each end, thus keeping the finger-bar always horizontal.

To provide a strong, steady, and simple pivot for the lever-arm which supports the grain-wheel, I rivet it to a disk or cheek, R, formed with a hub or sleeve, r, which takes over the pivot-bolt r' and bears by its exterior periphery against the walls of a cylindrical opening or boxing let through the thickness of the divider-board. On the inner side of the board a washer, s, and a nut, s', are applied to the pivot-bolt, and by turning up this nut the disk or cheek may be brought in contact with the outer surface of the board, thereby preventing the arm from tipping laterally, while permitting it a free pivotal motion.

The casting H, which carries as integral parts the step or socket h for the screw-rod and the guide-finger h' for the trip as a means of increasing the durability of the parts and insuring their constant relation, further has formed with or directly secured to it the pivot of the sheave g' for the main-wheel rope and the pivot of the sheave for the grain-wheel rope.

As the hands of the driver may be frequently employed in controlling the team, adjusting the reel, or shifting the binding-table or butting-board at the moment a change in height of the harvester becomes necessary, a pedal, T, may be provided and so connected with the lever that he may shift the latter from one notch to another and throw the screw-rod in or out of gear at will by a movement of his foot. It will be sufficient to pivot the pedal, as shown, about midway of its length, and to connect it with the lever by means of a stiff link, t, so that by rocking the pedal the lever may be either pulled forward or pushed back, springing in and out of the notches in its segment.

It is evident that the leading features of my invention may be variously modified—as, for instance, a chain-wheel may be substituted for the pulley on the main wheel-axle, as heretofore intimated, a chain or band for the wire rope, the rope, chain, or band may be carried directly from the pulley or wheel to a drum or guide-sheave on the rear of the machine, a crank and sprocket wheel or a winch staid by a dog or pawl, the screw-rod mounted in fixed bearings, and the reversed gears made to slide upon their shaft, to cause engagement or non-engagement with the pinion, the gears and pinion replaced by a hand-wheel, the screw-rod itself omitted, and the rope, band, or chain taken in and let out by means of a revolving drum driven by controllable connection with the harvester-gearing or by hand. These and other changes readily apparent to those skilled in the art, while they may not be so beneficial as the form hereinbefore described, I yet consider within the principle of my invention.

I claim—

1. In a harvester, the combination, with the supporting wheel or wheels, of adjusting mechanism operated by power derived from the draft of the team, and means, controllable at will, whereby without stopping the machine it may be thrown into action to raise the main frame bodily upon said supporting wheel or wheels, or out of action to hold it in position, or reversed to lower it.

2. In combination with power-operated adjusting mechanism for raising and lowering the harvester-frame upon its supporting wheel or wheels, and means, controllable at will, to throw it in or out of action, a safety-trip operating to automatically disconnect said mechanism from its driver whenever the extreme limit of adjustment in either direction is reached.

3. In combination with a supporting wheel or wheels, adjusting mechanism driven by reverse-gears on the harvester, and means, controllable by the attendant, whereby it may be thrown into engagement with one or the other of said gears to raise or lower the harvester-frame, or out of engagement altogether to hold it in its adjusted position.

4. In combination with an axle supported by fast pinions at its ends, which take into rack-standards on the frame, a pulley or chain wheel keyed to said axle, a rope, band, or chain taking over said pulley or wheel, and mechanism operated by power derived from the draft of the machine, and thrown in or out of action at will, whereby said rope, band, or chain may be taken up or let out to raise or lower the frame.

5. In combination with an axle supported by fast pinions at its ends taking into rack-standards on the frame, a pulley or chain wheel keyed thereto, a rope, band, or chain taking over said pulley or wheel, a screw-rod upon the frame-work, and a traveler upon said screw-rod, to which the rope, band, or chain is led over suitable guide-pulleys, and whereby its end is held so that it may be taken up or let out as the rod is turned in one direction or the other.

6. In combination with an axle supported by fast pinions at its ends which take into rack-standards on the frame, a pulley or chain wheel keyed thereto, a rope, band, or chain taking over said pulley or wheel, a screw-rod upon the frame-work, a traveler upon said screw-rod, to which the rope, band, or chain is led over suitable guide-pulleys, and whereby its end is held, and reverse-gears upon a driven shaft of the machine, with one or the other of which a pinion upon the end of the screw-rod may at will be caused to engage to move the traveler in one direction or the other.

7. In combination with an axle supported by fast pinions at its ends, which take into rack-standards on the frame, a pulley or chain wheel keyed thereto, a rope, band, or chain taking over said pulley or wheel, a vibratable screw-rod upon the frame-work, a traveler upon said screw-rod, to which the rope, band, or chain is led over suitable guide-pulleys, and whereby its end is held, reverse-gears upon a driven shaft of the machine, with either of which a pinion upon the free end of said rod may be brought into engagement, and a lever for vibrating the rod to throw said pinion in or out of engagement.

8. In combination with the reverse-gears, screw-rod, and traveler-block, by which the rope, band, or chain of the adjusting mechanism is taken up or let out, a trip arranged to be operated by the traveler or other suitable moving part as one extreme or the other of feasible adjustment is reached, to automatically throw the screw-rod out of engagement with the harvester-gearing.

9. In combination with an adjustably-mounted main wheel and an adjustably-mounted grain-wheel, a screw-rod supported on the frame-work, a traveler moving on the screw-rod, a rope, band, or chain leading from the traveler to the main-wheel support, and a rope, band, or chain leading from the traveler to the grain-wheel support, whereby they may be co-ordinately adjusted by the movement of the traveler.

10. The combination of the screw-rod pivotally supported in the step $h$, the traveler, the yoke-piece, and swivel-box, the pinion on the upper end of the screw-rod, the reverse-gears on the driven shaft, and the lever, whereby the yoke-piece may be rocked to throw the pinion into engagement with one or the other of said gears or out of engagement altogether.

11. The combination of the screw-rod, the traveler, the reciprocating guide-rod connected with the yoke-piece, and the stops upon said guide-rod, to determine the limits of movement of the traveler.

12. The yoke-piece J, supporting the swivel-bearing of the screw-rod, and formed to embrace the elevator-strut, substantially as and for the purpose set forth.

13. The angle-casting H, having formed integral therewith a stop for the screw-rod, and the bearings for the pulleys $g'$ and $q'$, substantially as and for the purpose set forth.

14. In combination with the hand-lever L, by which the adjusting mechanism is thrown in and out of gear, a pedal within reach of the driver in his seat, and a connecting-link between said lever and pedal, whereby the lever may be operated by the foot.

15. The pivot for the grain-wheel, consisting of the disk and its hub, the pivot-bolt, the washer and nut, substantially as and for the purpose described.

JOHN F. STEWARD.

Witnesses:
EDD. COLTON,
A. HART, Jr.